United States Patent Office 3,452,931
Patented July 1, 1969

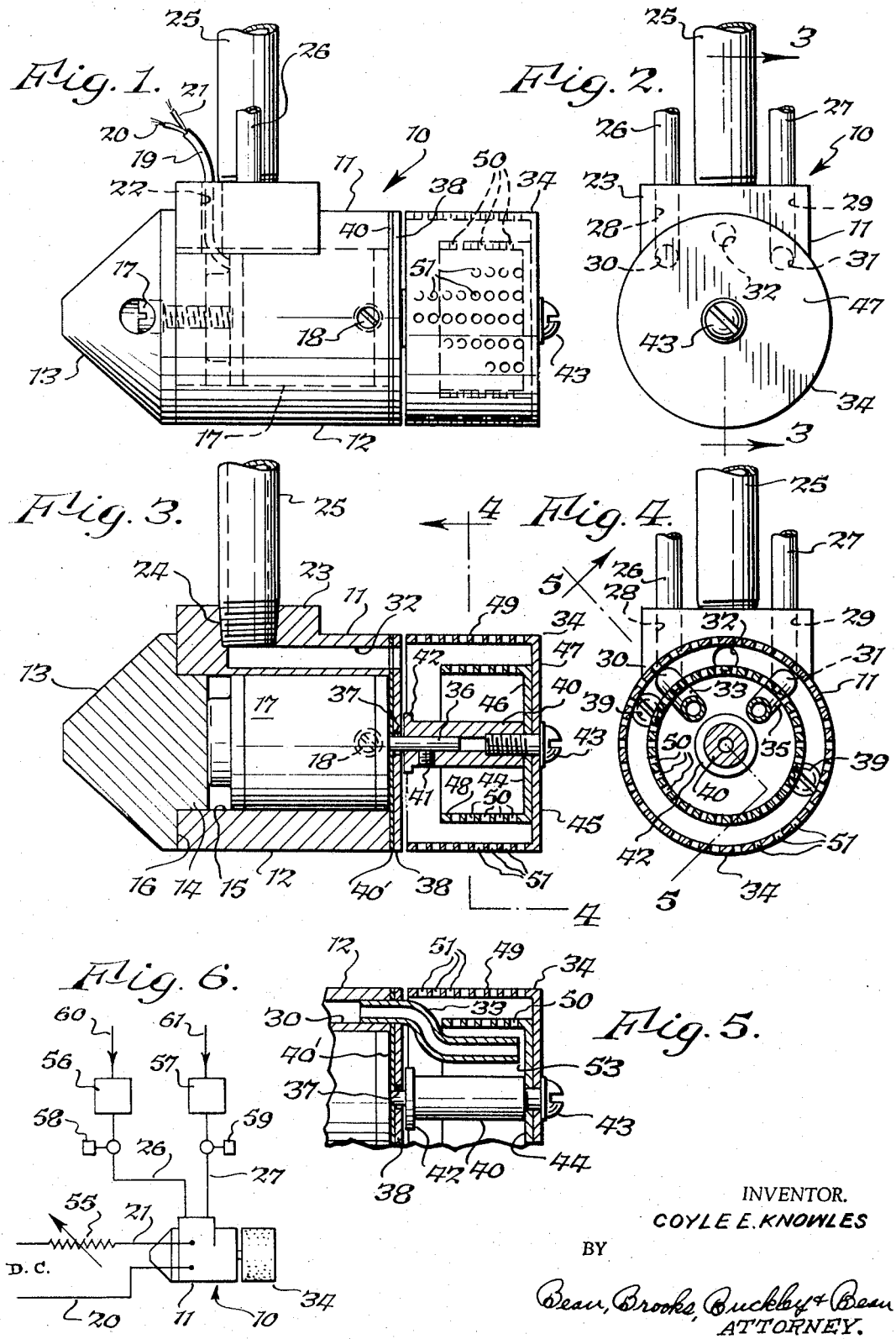

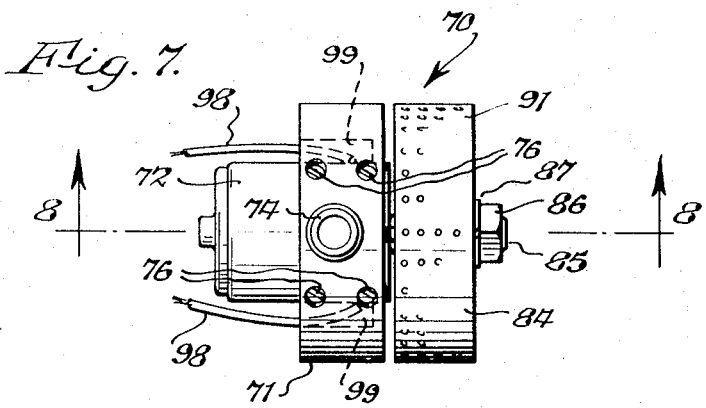
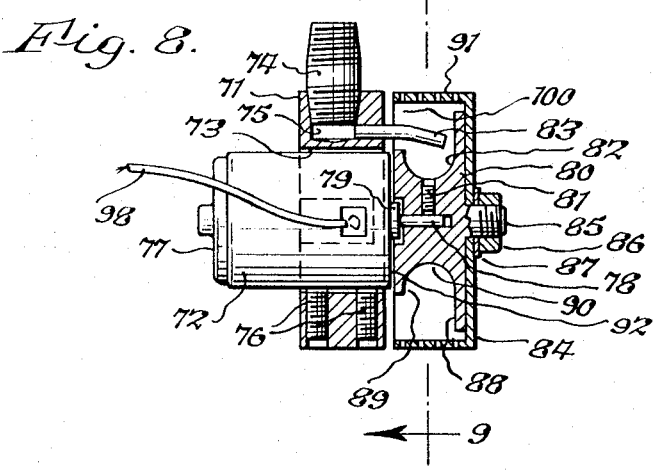
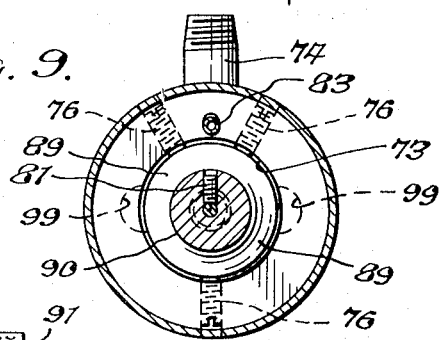
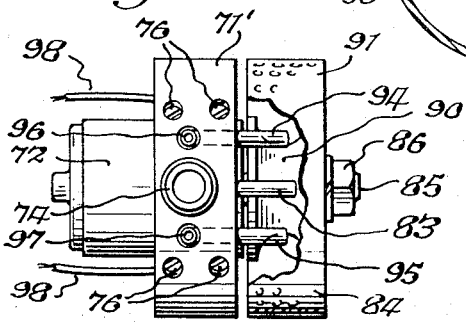

3,452,931
AGRICULTURAL SPRAYER
Coyle E. Knowles, Gowanda, N.Y., assignor to Buffalo Turbine Agricultural Equipment Co., Inc., Gowanda, N.Y., a corporation of New York
Continuation-in-part of application Ser. No. 623,035, Mar. 14, 1967. This application Apr. 15, 1968, Ser. No. 725,569
Int. Cl. B05b 3/02; F23d 11/04; A01n 17/08
U.S. Cl. 239—214.25
12 Claims

ABSTRACT OF THE DISCLOSURE

An ultra low volume single and multi-liquid sprayer including a housing mounting an electric motor carrying a rotor with a cage concentrically mounted thereon and conduit means for depositing a liquid or a plurality of liquids within the rotor which are dispersed by being flung centrifugally outwardly through the cage, the rotor including a flange proximate the motor for deflecting liquids away from the motor and its bearings, and the cage being of a diameter which is not greater than the diameter of the housing.

---

Cross reference to related application

The present application is a continuation-in-part of Ser. No. 623,035, filed Mar. 14, 1967, now abandoned.

Background of the invention

The present invention relates to an agricultural sprayer and more particularly to improved ultra low volume sprayers for dispensing a single liquid or for simultaneously dispensing a plurality of liquids, such as insecticides and fungicides.

In ultra low volume spraying, as little as four ounces per acre of fungicides or insecticides are dispensed either through aerial or ground spraying. Generally fungicides and insecticides are sprayed separately because the time of spraying is determined by the appearance of the pests to be controlled. However, relative to certain crops, such as apples and cherries, it is desirable to effect simultaneous spraying of both an insecticide and fungicide because of the simultaneous appearance of the pests which are to be destroyed. However, in the past the insecticides and fungicides could not be sprayed simultaneously from a single sprayer because of their incompatibility. In this respect, certain fungicides and insecticides could not be combined prior to introduction into the sprayer because they foamed, congealed, or were immiscible, or the like, which prevented their simultaneous spraying. Therefore, there was a multiple expense in applying these liquids separately. In addition, in ultra low volume spraying it was extremely difficult to obtain any degree of longevity from the drive motors and bearings of the spraying apparatus because either the fine mist of corrosive liquid being sprayed would penetrate the various seals and corrode the various parts, or the liquid being fed to the dispersing parts of the apparatus would flow into the motor and its bearings in response to changes in attitude of an aircraft on which the equipment was mounted. It is with overcoming the foregoing shortcomings of the prior art that the present invention is concerned.

Summary of the invention

It is accordingly one important object of the present invention to provide an improved ultra low volume multi-liquid sprayer which is capable of simultaneously dispensing a plurality of liquids which may be incompatible with each other.

Another object of the present invention is to provide an improved ultra low volume multi-liquid sprayer which is capable of providing a controlled flow of a plurality of liquids to the sprayer and which is also capable of dispensing such liquids in various particle sizes.

Another object of the present invention is to provide an improved ultra low volume single liquid and multi-liquid sprayer in which the motor which drives the sprayer is effectively isolated from the portion which disperses the liquids so that corrosion of the motor due to liquid entry is virtually obviated.

Yet another object of the present invention is to provide an improved ultra low volume sprayer which includes simplified and improved dispersing apparatus which also functions to prevent corrosive spray liquid from entering the motor and bearings either as a spray, or as a liquid when the aircraft on which it is mounted changes attitudes.

Still another object of the present invention is to provide an improved ultra low volume single liquid and multi-liquid sprayer in which the various parts are uniquely integrated to provide a highly efficient device. Other objects and attendant advantages of the present invention may readily be perceived hereafter.

The improved ultra low volume multi-liquid agricultural sprayers of the present invention include a housing which is adapted to be attached to the boom of an aircraft or to the nozzle of a ground sprayer. Encapsulated within the housing is a variable speed electric motor. Mounted relative to the housing are a plurality of conduits which conduct a plurality of liquids separately to a rotatable apertured double cage mounted on the shaft of the motor, said double cage effecting a double dispersion of both liquids. Because the feeding of the liquids into the double cage is followed by a substantially instantaneous dispersion thereof, incompatible liquids can be combined for simultaneous discharge without congealing, foaming, or otherwise reacting adversely. The double cage and the motor housing are associated with each other in such a manner that feedback of these liquids, which may be corrosive, into the motor housing is virtually obviated. The variable speed of the motor permits the speed of the double cage to be adjusted to an optimum value for each combination of liquids.

The improved ultra low volume sprayer of the present invention, both for dispensing a single liquid and a plurality of liquids includes an improved feed arrangement wherein liquid is fed through an annular opening in a cage. The improved sprayer also includes an improved dispersing assembly consisting of a cage mounted on a rotor having a concave central portion bounded by two spaced flange-like portions, with one of the flanges being adjacent the drive motor and functioning as a shield to prevent corrosive spray and liquid from entering the bearings or the motor. In addition, the relative sizes of the cage and housing cause dispersion to be effected solely by centrifugal force, without being affected by the air currents encountered in flight.

*Brief description of the drawings*

FIGURE 1 is a side elevational view of the improved ultra low volume multi-liquid sprayer of the present invention;

FIGURE 2 is an end elevational view taken from the right of FIGURE 1;

FIGURE 3 is a view, partially in cross section, with certain parts omitted in the interest of clarity, taken substantially along line 3—3 of FIGURE 2;

FIGURE 4 is a view, partially in cross section, taken substantially along line 4—4 of FIGURE 3;

FIGURE 5 is a fragmentary view showing the manner in which one of the liquids is fed into the double cage and is taken substantially along line 5—5 of FIGURE 4 with certain parts omitted in the interest of clarity;

FIGURE 6 is a schematic diagram showing both the electrical and flow control for the improved ultra low volume sprayer of the present invention;

FIGURE 7 is a plan view of a preferred embodiment of the present invention;

FIGURE 8 is a view partially in cross section taken substantially along line 8—8 of FIGURE 7;

FIGURE 9 is a view, partially in cross section taken substantially along line 9—9 of FIGURE 8; and FIGURE 10 is a fragmentary view of an embodiment identical in all respects to the embodiment of FIGURES 7–9, but having a plurality of liquid inlets.

*Description of the preferred embodiments*

The improved ultra low volume multi-liquid sprayer 10 of FIGURES 1–6 includes a housing 11 having a cylindrical shell 12, one end of which is closed by frustoconical plug 13 having reduced circular portion 14 which fits within chamber 15 of housing portion 12. Shoulders 16 on plug 13 abut against the end of cylindrical member 12. Diametrically opposed screws 17 extend through a portion of plug 13 and are received in cylindrical shell 12.

Within the chamber 15 a DC motor 17 is tightly held by means of diametrically opposed screws 18 extending through shell 12. The motor lead-wire 19, which includes leads 20 and 21, extends outwardly of housing 11 through conduit 22 therein, said conduit passing through crown portion 23 of the housing which is cast integrally with cylindrical porton 12. Crown 23 includes a tapped aperture 24 which receives pipe-like member 25 which carries a suitable connection at its opposite end for attachment to a boom carried proximate the trailing edge of the wing of an aircraft. This connection may be a simple thread at the end of pipe 25. Pipe 25 may also be used to mount sprayer 10 within a nozzle of a suitable ground sprayer. Motor 17 can be removed from housing 11 by removing plug 13 and loosening screws 18.

Liquid conduits 26 and 27 extend into crown 23 and are in communication with conduits 28 and 29, respectively, therein. Conduit 28 is in communication with conduit 30, which is a longitudinal bore in shell 12 of housing 11. Conduit 29 is in communication with conduit 31 which is a bore extending longitudinally of shell 12. A third bore 32, FIG. 3, is in communication with pipe 25 which may also be used to carry liquid, if desired. A conduit 33 (FIG. 5) has one end thereof press-fitted into conduit 30 for conducting liquid within the confines of double cage 34, and this conduit extends through the annular space lying inwardly of cylindrical cage wall 49. An identical conduit 35 has one end press-fitted into the end of conduit 31 and its opposite end located within the confines of double cage 34 in the same manner as conduit 33. It can thus be seen that two separate conduits 26 and 27 can separately convey two different liquids, such as an insecticide and a fungicide, into double cage 34. While conduits 33 and 35 are illustrated as depositing both liquids within inner cage 44, under certain circumstances it may be desirable to deposit one liquid within cage 44 and the other liquid between walls 48 and 49, by positioning one of the conduits between said walls.

The double cage 34 is driven by motor 17. In this respect the motor shaft 36 extends through aperture 37 in plate 38 which is affixed to the end of housing member 12 by screws 39, with a gasket 40' therebetween to effectively seal motor 17 within chamber 15. The mounting of double cage 34 on shaft 36 is through elongated collar or rotor 40 which is attached to shaft 36 by set screw 41. Collar 40 includes an enlarged collar or flange 42 thereon which is proximate aperture 37. During rotation any liquid deposited on the outside of rotor 40 will be flung radially outwardly upon hitting enlarged flange 42, thereby tending to prevent entry of corrosive liquid into aperture 37.

The double cage 34 is mounted on rotor 40 by means of screw 43 which extends through centrally located apertures, not numbered, in the end walls 44 and 45 of inner cage 46 and outer cage 47, respectively. Inner cage 46 has a cylindrical side wall 48, and outer cage 47 has a cylindrical side wall 49. Walls 48 and 49 are mounted in concentric relationship to each other, and the diameter of wall 49 is no greater than the diameter of housing shell 12, which prevents air in excessive amounts from entering the annular space inwardly of wall 49 at its edge proximate shell 11. It is to be noted that there are apertures 50 in side wall 48 and apertures 51 in side wall 49.

The double cage 34 is capable of dispensing a mixture of two finely dispersed liquids simultaneously, even if such liquids are of the type which are incompatible, in that they are immiscible or might otherwise tend to congeal or foam on mixing. In this respect it is to be noted that the end 53 of conduit 33 is close to end wall 44 of inner cage 46. The end of conduit 35 occupies a similar relationship. The liquids which emanate from the end of conduits 33 and 35 impinge on end wall 44, and the centrifugal force due to rotation thereof carries these liquids to the inside surface of side wall 48 and these liquids are given a primary dispersion in passing through apertures 50. Thereafter, the liquids will impinge on the inside surface of side wall 49 and are given a secondary dispersion upon passing through apertures 51. Motor 17 is capable of rotating between 5,000 and 14,000 r.p.m., thereby to dispense droplets varying from coarse to aersol size. It is this speed of rotation which contributes substantially to the instantaneous discharge of a plurality of liquids deposited within double cage 34. It is the instantaneous discharge which causes liquids which are incompatible to be effectively combined without any accompanying foaming or congealing.

The improved multi-liquid ultra low volume sprayer 10 of the present invention is incorporated into a spraying system in the manner shown in FIGURE 6. More specifically, the motor 17 of sprayer 10 is coupled to a DC source through leads 20 and 21. A rheostat 55 in lead 21 controls the voltage across motor 17, and it is by varying the voltage that the speed is controlled between the 5,000 and 14,000 r.p.m. noted above. Conduits 26 and 27 are in communication with tanks 56 and 57, respectively, each of which contain a fungicide or insecticide. Vernier valves 58 and 59, which may be of the type manufactured by Alkon Products of Wayne, N.J. and identified as Model J.N. 1 in catalog 14–2, are located in conduits 26 and 27, respectively, for metering the flow to double cage 34. Conduits 60 and 61 lead from a suitable source of compressed air to apply a predetermined pressure to the liquids in tanks 56 and 57, thereby insuring feed from said tanks at a controlled rate. In lieu of compressed air conduits 60 and 61, suitable pumps may be used, if desired.

By way of example, a formulation of dodine with the consistency of an inspissated syrup was fed to sprayer 10 when the latter was mounted on an aircraft having a velocity of 120 miles per hour. Motor 17 was rotated at 9,000 r.p.m. When a small amount of water was mixed with the dodine before feeding the latter to the double cage, large quantities of foam were created blocking the conduits 33 and 35. No foaming or blockage occurred when the dodine and the water were brought to double cage 34 through separate lines 33 and 35. It was also found that coverage and spreading action of less viscous formulations of dodine containing oil were also improved when this material was sprayed with water when the mixing took place in double cage 34. The combining of material known under the trademark Cyprex-A with material known under the trademark Glyodin results in a congealed jelly; however, feeding these materials separately to sprayer 10 results in satisfactory simultaneous dispersion without congealing. By way of further example, Glyodin and dodine are immiscible and therefore cannot be mixed before spraying; however, the feeding of these materials separately to sprayer 10 results in their satisfactory simultaneous dispersion. The foregoing examples indicate how two normally incompatible liquids, which would otherwise congeal, or foam, or are immiscible, can be combined for simultaneous spraying on crops, because of the instantaneous dispersing action of the sprayer to which the incompatible liquids are fed separately and simultaneously. In other words, the instantaneous separate dispersion produces a mixing which overcomes the problem of incompatibility.

It will be appreciated that while mixing of only two liquids are illustrated by the sprayer 10 shown in the accompanying drawing, numerous other liquids can be introduced through additional conduits, such as 32 shown in FIGURES 3 and 4. If desired, an entire series of circumferentially located conduits can be placed in cylindrical housing member 12.

The inner cage has an outer diameter of 1.375" and includes thirty rows of apertures with five holes in each row. The apertures are placed on .125" centers, said holes each being .052" in diameter. The side wall 48 is .0625" thick. Large cage 47 has an outer diameter of 1.875" and includes thirty rows of eight holes per row circumferentially spaced on outer wall 49 with the holes being of .052" in diameter and spaced on .125" centers. The side wall 49 is .0625" thick. The unit 10 is approximately four inches long and approximately two inches in diameter, and the parts are shown to scale.

In FIGURES 7 through 10 preferred embodiments of the invention are disclosed. The sprayer 70 includes a housing in the form of annular collar 71 which receives electric motor 72 in central opening 73 therein. Housing 71 is mounted on the boom extending under the wing of an aircraft by means of nipple 74 having its lower end threaded into aperture 75 and its upper end threaded into a mating aperture in the boom. Motor 72 is held in position by three pairs of circumferentially spaced set screws 76. It will be appreciated that if it is desired to remove electric motor 72, it is merely necessary to loosen set screws 76 and withdraw the motor from housing 71. In this respect it is to be especially noted that motor 72 is relatively inexpensive and can be replaced as required, that is, when it ceases to function or when the bearings associated therewith become corroded. The sprayer 70 is mounted in such a manner that the end 77 of the motor faces into the direction of flight.

Motor 72 includes a shaft 78 mounted in motor bearing 79. A circular liquid dispersing rotor 80 is attached to shaft 78 by set screw 81. Liquid is directed onto the outer periphery 82 of rotor 80 by conduit 83 which is in communication with bore 75, conduit 83 being press fitted into housing 71 or otherwise suitably secured therein. A cage 84 is secured to central screw 85, which is formed integrally with rotor 80 by nut and washer 86–87, the screw extending through a central aperture, not numbered, in cage 84.

The liquid emanating from conduit 83 is deposited on surface 82 of rotor 80, said surface being formed by the surfaces of flanges 88 and 89 which are connected by centrally depressed concave portion 90. It can readily be seen that liquid deposited on the surface of flange 88 will be flung outwardly by centrifugal force, and subsequently dispersed by passing through the apertures in the cylindrical wall portion 91 of cage 84. If for any reason there should be an excess of liquid deposited on surface 88 so that it moves downwardly onto concave surface 90, it can thereafter be flung radially outwardly by movement on the surface of flange 89. At this point it is to be noted that flange 89, which is adjacent motor 72, functions in the same manner as collar 42 described above relative to FIGURE 3. However, flange 89 is sufficiently large so that it practically covers the face 92 of motor 72 so that the liquid being flung outwardly by the rotor cannot collect on face 92 and work its way back into contact with bearing 79.

It is to be especially noted that the rotor configuration is effective to prevent liquid from depositing on face 92 in the event that the attitude of the aircraft on which it is mounted changes. More specfically, if the left end of motor 72 should point downwardly, any liquid running to the left in FIGURE 8 on concave portion 90 will be flung outwardly and away from motor 72 and thus will not be able to enter the bearing 79 while this liquid is still in liquid form and obviously will not be able to enter the bearings when it is in spray form.

It is to be noted that the outer diameter of housing 71 is at least as great as the outer diameter of cage 84. Therefore, housing 71 will shield the cage 84 so that the wind traveling to the right in FIGURE 8 will not enter the space 100 between annular cyindrical wall 91 and the outer edge of flange 89. In this respect it is to be especially noted that it is through this annular space 100 that conduit 83 of FIGURE 8 and conduits 94 and 95, as well as 83 of FIGURE 10, extend to deliver liquid to rotor 80. In other words, the housing 71 shields annular space 100 from the wind currents catching up the liquid emanating from the conduit before it can be dispersed by the combined action of the rotor and the cage.

In FIGURE 10 a still further modification of the embodiment of FIGURES 7 through 9 is shown. This modification is identical in all respects to the foregoing embodiment but differs therefrom only in that it shows conduits 94 and 95 in communication with conduits 96 and 97, respectively, which extend through housing 71' which is identical to housing 71 except that it has additional holes therein to accommodate the above mentioned conduits. Conduits 96 and 97 may be placed in housing 71 in a manner alalogous to conduit 74 and conduits 94 and 95 in a manner analogous to conduit 83. By the use of the embodiment in FIGURE 10, many liquids can be sprayed simultaneously as described in detail above relative to FIGURES 1 through 6.

Electrical leads 98 which conduct electricity to motor 72 are received in cutouts 99 in housing 71. The circuit for energizing motor 72 and the manner of delivering liquid may be identical to that described above relative to FIGURE 6.

The cage 84 has an outer diameter of 1.875 inches, and has 30 rows of .052" holes which are equally spaced, each row containing four holes of 1/8" centers.

It is to be noted that in all the embodiments the diameter of the outer cage is preferably substantially the same as the diameter of the housing adjacent thereto. The housing thus shields the cage so that there will not be a positive or negative pressure in the cage. More specifically, if the cage were larger than the housing, there could be a positive pressure therein due to a ram jet effect of air moving into the annular space, such as 100 (FIG. 8). If the cage were smaller, there would be a negative pressure due to an aspirating effect of air flow across the cage. In other words, it is desirable that the liquid be dispersed solely by centrifugal force and not be affected by air pressure.

While all embodiments of the sprayer of the present invention have been described primarily relative to an aircraft, it will be appreciated that they can also be mounted on land operated spraying equipment which is carried on a vehicle or by a person.

I claim:
1. An ultra low volume liquid sprayer comprising a housing, a motor mounted on said housing, a shaft extending from said motor, a rotor mounted on said shaft, cage means mounted relative to said rotor for rotation therewith, said cage means including an end wall and a substantially annular perforated side wall connected thereto to define a chamber, said end wall being located relatively remote from said housing and said annular perforated side wall lying between said end wall and said housing, an annular opening in said cage means located in opposition to said end wall and in contiguous relationship to said housing with said annular opening being of no greater diameter than said housing so that said housing serves to shield the chamber defined by said cage means against the entry of wind, and conduit means extending into said cage means through said annular opening to supply liquid to be dispersed into said chamber, with said end wall directing flow of said liquid radially outwardy through said annular perforated side wall to insure dispersion thereby.

2. A liquid sprayer as set forth in claim 1 wherein said rotor includes flange means extending transversely to said shaft and located proximate said motor and remote from said end wall for flinging outwardly any liquid on said rotor which travels toward said motor.

3. A liquid sprayer as set forth in claim 2 wherein said cage means includes a second substantially annular perforated side wall located concentrically within said annular side wall and wherein said conduit means are positioned within said second side wall to supply said liquid between said rotor and said second side wall to produce a double dispersion.

4. A liquid sprayer as set forth in claim 2 wherein said flange means is of at least the same diameter as said motor.

5. A liquid sprayer as set forth in claim 2 wherein said rotor also includes second flange means extending transversely to said shaft and spaced from said flange means, and a surface of concave curvature therebetween to enhance flow of said liquid outwardly toward said annular wall.

6. A liquid sprayer as set forth in claim 2 wherein said rotor includes a concave outer portion which merges into said flange means.

7. A liquid sprayer as set forth in claim 1 including means for removably mounting said motor in said housing.

8. A liquid sprayer as set forth in claim 1 wherein said conduit means comprises a plurality of conduits extending into said cage means for depositing a plurality of liquids into said chamber defined by said cage means.

9. A liquid sprayer as set forth in claim 1 wherein said conduit means extend through said housing.

10. A liquid sprayer as set forth in claim 9 wherein said conduit means comprise a plurality of conduits extending through said housing into said cage means for depositing a plurality of liquids into the chamber defined by said cage means.

11. A liquid sprayer as set forth in claim 1 including control means for varying the speed of rotation of said motor.

12. A liquid sprayer as set forth in claim 8 wherein said cage means includes a second substantially annular perforated side wall located concentrically within said annular side wall and wherein said plurality of conduits are positioned within said second side wall to supply said liquid between said rotor and said second side wall to produce a double dispersion.

References Cited

UNITED STATES PATENTS

| | | | |
|---|---|---|---|
| Re. 20,982 | 1/1939 | Alden et al. | 239—214.25 X |
| 2,979,269 | 4/1961 | Bals | 239—222 X |
| 2,986,338 | 5/1961 | Foster | 239—222 |
| 3,029,027 | 4/1962 | Gray | 239—224 X |
| 3,133,702 | 5/1964 | Stelcher | 239—214 X |
| 3,192,167 | 6/1965 | Ogawa et al. | 239—223 X |

FOREIGN PATENTS

| | | |
|---|---|---|
| 504,592 | 7/1951 | Belgium. |
| 1,466,620 | 12/1966 | France. |

EVERETT W. KIRBY, *Primary Examiner.*

U.S. Cl. X.R.

239—77, 171, 222, 224